United States Patent [19]

Goodale et al.

[11] Patent Number: 4,955,992
[45] Date of Patent: Sep. 11, 1990

[54] LIQUID DEGASSING SYSTEM

[75] Inventors: David L. Goodale, Anaheim; Bradford K. Hess, Orange, both of Calif.

[73] Assignee: Beckman Instruments, Inc., Fullerton, Calif.

[21] Appl. No.: 230,663

[22] Filed: Aug. 9, 1988

Related U.S. Application Data

[63] Continuation of Ser. No. 67,067, Jun. 26, 1987, abandoned.

[51] Int. Cl.⁵ .............................................. B01D 19/00
[52] U.S. Cl. ......................................... 55/160; 55/192
[58] Field of Search ................. 55/159, 160, 189–193; 137/597

[56] References Cited

U.S. PATENT DOCUMENTS

| | | | |
|---|---|---|---|
| 2,151,644 | 3/1939 | Stephens | 55/193 |
| 2,182,724 | 12/1939 | Hennessy | 137/597 |
| 2,837,318 | 6/1958 | Winternitz | 137/171 |
| 3,460,319 | 8/1969 | Tkach | 55/190 |
| 3,608,272 | 9/1971 | Di Peri et al. | 55/15 |
| 4,572,724 | 2/1986 | Rosenberg | 55/159 |

FOREIGN PATENT DOCUMENTS

| | | | |
|---|---|---|---|
| 0108266 | 10/1983 | European Pat. Off. | |
| 0206119 | 6/1986 | European Pat. Off. | |
| 444122 | 10/1965 | Switzerland | |
| 2117873 | 10/1983 | United Kingdom | 137/625.65 |

*Primary Examiner*—Bernard Nozick
*Attorney, Agent, or Firm*—William H. May; Arnold Grant; Gary T. Hampson

[57] ABSTRACT

A liquid degassing system including a liquid reservoir having an inlet to receive a liquid to be degassed and an outlet through which degassed liquid may flow. A vacuum source is controllably connected through a valve to the reservoir to draw gas out of the liquid held within the reservoir. A valve in a liquid inlet conduit supplying the reservoir may interrupt flow to the reservoir while vacuum is applied thereto. A second valve in an outlet conduit connected to the reservoir may interrupt flow from the reservoir when vacuum is applied to the reservoir.

23 Claims, 1 Drawing Sheet

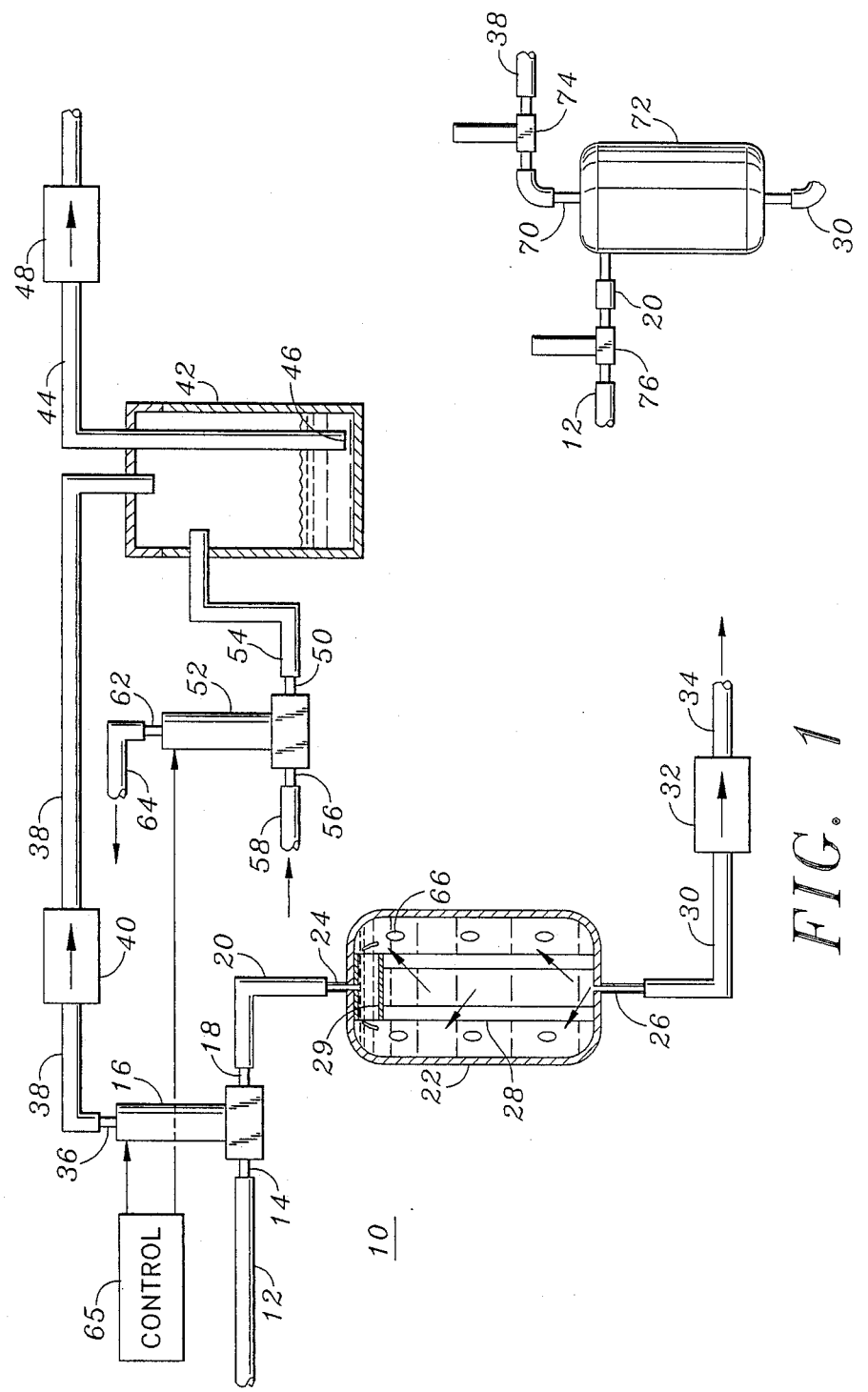

LIQUID DEGASSING SYSTEM

This is a continuation of application Ser. No. 067,067, filed 6/26/87 now abandoned.

FIELD OF THE INVENTION

The present invention relates generally to the field of liquid handling and processing systems and more particularly to the field of liquid degassing.

BACKGROUND OF THE INVENTION

It is well known that gases such as air can be dissolved into and carried by liquids such as water. For example, it is common to find dissolved air in deionized water supply lines in chemical and biological research facilities, clinical chemistry laboratories and hospitals. It is also common to find gas bubbles in such water supply lines.

Although many uses of such deionized water supplies may tolerate dissolved gas as gas bubbles very well, such gas in some applications can prove troubling. As an example, the performance of automated clinical chemistry analyzers can be adversely affected by the gas often found in deionized water supply lines.

More particularly, it is common practice in automated clinical chemistry analyzers to employ a sample transfer system to transfer samples, such as patient body fluid specimens, from a sample cup to a reaction cuvette. In the reaction cuvette, reagents may be added to the sample and the resulting reaction monitored to ultimately determine the concentration of a substance in the sample. Typically, the sample transfer system includes a probe that is connected both to a precision metering syringe-type pump and to a source of deionized water. The probe may be connected via a flexible tube or conduit to a tee fitting with the tee fitting in turn connected to the syringe pump and to a pinch valve that is supplied with deionized water. The syringe pump is used to draw a precise predetermined volume of sample into the probe and then dispense the sample volume into the reaction cuvette. Once such a transfer is completed, the pinch valve is opened and deionized water is passed through the probe to flush the interior of the probe. The external surfaces of the probe may also be washed to thereby minimize carryover of sample from one transfer operation to the next.

A common problem experienced with sample transfer systems like the one just described is the formation or collection of gas bubbles in the conduit between the syringe pump and the probe. Deionized water remains in this portion of the conduit after the probe has been flushed. In part because the retained deionized water is no longer under pressure and due to cooling of the conduit, dissolved gas in the water comes out of solution, forming gas bubbles in the conduit. Also, gas bubbles in the deionized water supply may find their way into this portion of the conduit. Unfortunately, the amount of sample metered by the syringe pump may vary due to the compressibility of these gas bubbles. These variations can be particularly troubling because the accuracy of the sample analysis depends in part upon the precision with which the sample is metered into the reaction cuvette.

Automated analyzers of the type just described also commonly employ reagent transfer systems for transferring reagents from storage vessels to the reaction cuvette. Such reagent transfer systems may be essentially identical to the sample transfer system just described and thus suffer from the same difficulty with the accuracy of reagent volume delivered to the reaction cuvette. Also, reagents may be stored in a refrigerated environment. Before being transferred to the reaction cuvette, the reagents must be heated to the reaction temperature. This heating is also known to cause dissolved gasses in the reagents to form gas bubbles either in the reagent transfer system or in the reaction cuvette where such bubbles can interfere with the sensing technique, such as electrochemistry, colorimetry, or nephelometry.

Thus, it is known in clinical chemistry analyzers to attempt to remove gas from liquids before gas bubbles can form or collect which may affect analyzer performance. For example, it is known to utilize a degasser in the form of a small liquid reservoir having an open end over which a membrane or a hydrophobic filter is retained. The membrane or filter is permeable to gas but is not permeable to liquid. With the passage of time, dissolved gas or gas bubbles in the liquid held in the reservoir will gradually pass through the gas permeable membrane or filter. Unfortunately, this type of liquid degasser is very slow and can only be used where very small volumes of liquid are required over a given time period. If the membrane fails or if the hydrophobic filter becomes wetted, liquid leakage from the reservoir will result. Also, if a large gas bubble or a series of smaller bubbles enter the reservoir, the bubbles may be drawn through the degasser before the gas bubbles can pass through the membrane or filter.

Thus, there is a need for a liquid degassing system which can quickly process larger volumes of liquid than those devices known in the prior art. Furthermore, such a system should reduce or eliminate potential leakage which may otherwise result from membrane failure in such known systems.

SUMMARY OF THE INVENTION

The present invention overcomes the limitations and drawbacks of the prior art and provides a novel and very effective liquid degassing system capable of processing volumes of liquid greater than the capacity of the prior art devices. A liquid degassing system in accordance with the present invention includes a reservoir adapted to receive liquid to be degassed. With liquid in the reservoir, a vacuum is applied to the reservoir, thereby causing gas contained in the liquid held by the reservoir to form bubbles and be withdrawn. The reservoir may include a liquid inlet to receive liquid to be degassed and a liquid outlet through which degassed liquid may flow. The system may further include a valve to interrupt the flow of liquid through the reservoir inlet and a second valve to prevent reverse flow through the reservoir outlet when vacuum is applied. The reservoir itself may include means for deflecting the flow of liquid through the reservoir so that the liquid will have an adequate opportunity to be degassed. The deflecting means may take the form of a a baffle or filter material disposed within the reservoir.

BRIEF DESCRIPTION OF THE DRAWINGS

FIG. 1 illustrates in simplified form a liquid degassing system in accordance with the present invention.

FIG. 2 illustrates a modification of the degassing reservoir of the system of FIG. 1.

DETAILED DESCRIPTION OF THE INVENTION

With reference to FIG. 1, a liquid degassing system 10 in accordance with the present invention is connected to a supply conduit 12 which carries pressurized liquid to be degassed. In the embodiment disclosed herein, the supply conduit 12 carries deionized water from a suitable source thereof at approximately 10 psig. The supply conduit 12 is connected to a normally closed port 14 of a solenoid operated valve 16. The valve 16 includes an outlet port 18 which is connected via a conduit 20 to a degassing reservoir 22 shown in cross section in FIG. 1.

The degassing reservoir 22 is generally in the form of a closed cylinder and includes an inlet port 24 to which the conduit 20 is connected and an outlet port 26. The inlet and outlet ports 24 and 26 are disposed on opposite ends of the degassing reservoir 22 with the inlet port 24 positioned at the top of the reservoir 22. The reservoir 22 is positioned with respect to the valve 16 such that the inlet port 24 is below the outlet port 18 and the conduit 20 is short. In the embodiment disclosed herein, the conduit is about six inches long. The orientation of the inlet port 24, the placement of the reservoir 22 with respect to the valve 16, and the length of the conduit 20 all help obtain efficient and rapid removal of gas bubbles from the reservoir 22 through the conduit 20 and valve 16 as is described below with reference to the operation of the system 10.

A hollow cylindrical filter element 28 is disposed within the degassing reservoir 22 in the flow path between the inlet and outlet ports 24 and 26. More particularly, liquid flowing into the degassing reservoir 22 first flows about the filter element 28 between the filter element 28 and the wall of the reservoir 22. The liquid then flows through the filter element 28 and out of the reservoir 22 through the outlet port 26. As so configured, a baffle 29 proximate the inlet port 24 and the material comprising the filter element 28 deflect the direct flow of liquid through the reservoir 22. The filter element 28 may also provide a large surface area within the degassing reservoir 22 upon which dissolved gas may form.

In the embodiment disclosed herein, the degassing reservoir is a in-line liquid filter model DFU 9900, type DX filter tube available from Balston, Inc., 703 Massachusetts Avenue, Lexington, Mass. 02173. The liquid flow through the filter is reversed from normal liquid flow when the filter is used only to provide in-line particulate filtering. As so connected, the filter element 28 and baffle 29 enhance liquid degassing, preventing liquid from flowing directly between the inlet and outlet ports 24 and 26.

It is to be recognized that various forms of the reservoir 22 are equally suitable, such as a large reservoir that discourages a direct liquid path between the inlet and outlet, or the use of other baffles or packing material that would provide the same effect. By using the filter element 28, discrete gas bubbles tend to remain on the outside surface of the element 28 for ready removal, rather than passing through the element 28 toward the outlet 26.

The outlet port 26 of the degassing reservoir 22 is connected through a conduit 30 and check valve 32 to an outlet conduit 34 of the liquid degassing system 10. The outlet conduit 34 provides a source of degassed liquid. For example, in the context of an automated clinical analyzer, the outlet conduit 34 may be connected through suitable pinch valves to reagent and/or sample liquid transfer probes for cleaning the probes by flushing deionized and degassed water therethrough as is known in the art.

Continuing now with the system 10 of the present invention, the valve 16 includes a normally open port 36 which is connected via a conduit 38 and check valve 40 to a liquid trap 42. The liquid trap 42 is in the form of a sealed vessel. A drain conduit 44 includes an open end 46 disposed proximate the bottom of the liquid trap 42. The drain conduit 44 is connected through a check valve 48 to a suitable drain. An outlet port 50 of a solenoid operated valve 52 is connected by a conduit 54 to the liquid trap 42. A normally closed port 56 of the valve 52 is connected via a conduit 58 to a suitable source of pressurized gas useful for draining the liquid trap 42 and a normally open port 62 of the valve 52 is connected via a conduit 64 to a suitable source of vacuum. Both of the solenoid operated valves 16 and 52 are controlled by means of a suitable controller 65 for implementing the timing and control functions now to be described.

To begin the operation of the liquid degassing system 10, the system 10 is first primed by energizing the valve 16. When energized, the port 14 is connected to the port 18 and the port 36 is closed. Liquid flows from the supply conduit 12 through the valve 16 and the conduit 20 to the degassing reservoir 22, filling the reservoir 22. The flow of the liquid from the degassing reservoir 22 may be metered, for example, by the liquid demands of external devices connected to the outlet conduit 34.

With the system 10 primed, the valve 16 is de-energized. With the valve 16 de-energized, the outlet port 18 is connected to the port 36 and the port 14 is closed. The vacuum pulled in the conduit 64 is conducted through the valve 52 and conduit 54 to the liquid trap 42. In turn, the vacuum is applied via the conduit 38 and the check valve 40 through the valve 16 to the degassing reservoir 22. The vacuum applied to the degassing reservoir 22 causes dissolved gas in the liquid contained within the reservoir 22 to form gas bubbles on the interior surface of the reservoir 22 and the filter element 28. These bubbles along with gas bubbles that may be included in the liquid, both illustrated in enlarged fashion by gas bubbles 66, are drawn out of the reservoir 22 via the inlet port 24. The gas bubbles are drawn through the conduit 20, valve 16, conduit 38, and valve 40 into the liquid trap 42. The degassing is relatively rapid with gas bubbles 66 quickly forming within the reservoir 22 and being drawn into the liquid trap 42. As the bubbles 66 move along the path between the degassing reservoir 22 and the liquid trap 42, some liquid is carried with the bubbles. The liquid is captured in the lower portion of the liquid trap 42.

When the external devices connected to the conduit 34 require liquid from the system 10, the valve 16 is energized, reconnecting the outlet port 18 with the port 14 and closing the port 36. Degassed liquid may then be drawn through the outlet conduit 34 from the degassing reservoir 22.

Periodically, the system controller energizes the valve 52. The port 62 is closed and pressurized gas applied to the port 56 via the conduit 58 is thus connected through the valve 52 to the liquid trap 42 and closing the port 56. Liquid temporarily stored within the trap 42 is forced out of the trap 42 under the influence of the pressurized gas through the conduit 44 and check valve 48 to a suitable disposal point such as a liquid drain. The valve 52 is then de-energized, reconnecting the vacuum drawn in the conduit 64 to the reservoir 42.

The system controller may synchronize the operation of the valve 16 with demand from devices connected to the conduit 34 such that no liquid from the system 10 is required while the valve 16 is de-energized. For example, if the conduit 34 is connected to a pinch valve used in a sample transfer system as described above, the system controller may synchronize the operation of the valve 16 such that the valve 16 is energized just before the pinch valve is opened. Also, the system controller may synchronize the operation of the valves 16 and 52 such that the valves 16 and 52 are not simultaneously energized.

Each of the check valves 32, 40 and 48 prevent unwanted back flow in the associated conduits. Check valve 32 prevents back flow into the degassing reservoir 22 when vacuum is applied thereto via the valve 16. Check valve 40 prevents back flow into the reservoir 22 when the liquid trap 42 is pressurized via conduits 58 and 54 and the valve 52. Lastly, check valve 48 prevents back flow into the liquid trap 42 when vacuum is applied thereto via the conduits 64 and 54 and the valve 52.

In the embodiment disclosed herein, the volume of the degassing reservoir 22 is approximately 50 ml. A complete degassing and liquid removal cycle consists of the application of vacuum to the reservoir 22 for about eight seconds followed by removal of about ten percent of the liquid in the reservoir 22 through the conduit 30. The vacuum applied is approximately 28 in. of mercury developed by a vacuum pump, although other suitable vacuum sources such a peristaltic pump may be used.

Modifications to the system 10 will be readily apparent to those skilled in the art. For example, vacuum may be applied to the reservoir for degassing purposes through a separate conduit. In such an embodiment as illustrated in FIG. 2, a separate degassing outlet 70 may be included in a degassing reservoir 72. Such a degassing outlet 70, preferrably positioned at the top of the reservoir 72 to obtain easy removal of gas bubbles accumulated therein, may be connected to a two-port solenoid controlled valve 74 that is in turn connected to the conduit 38. The valve 16 would be replaced with a two-port solenoid controlled valve 76 connected between the conduits 12 and 20. The operation of such two two-port valves 74 and 76 would be synchronized to apply either vacuum or liquid to the degassing reservoir 72.

Furthermore, a peristaltic pump may be used to develop the vacuum required for the system 10. A peristaltic pump may also be used to control and/or pump liquid into the degassing reservoir. The inherent valving action of peristaltic pumps may be used to eliminate check valves, all in a fashion that will be readily apparent to those skilled in the art. For example, a peristaltic pump in the conduit 12 and a peristaltic pump in the conduit 38 would replace the valves 16 and 40, providing liquid pumping and/or control for liquid flowing into the reservoir 22 and vacuum to provide the degassing action. The peristaltic pump in the conduit 12 would also be used to pump degassed liquid through the reservoir and out through the conduit 34 to external devices.

Thus, the liquid degassing system 10 of the present invention provides liquid degassing for a large volumes of liquid as compared to the prior art devices described above. The system 10 can remove substantial volumes of gas carried by or dissolved within a liquid in a short amount of time. The system 10 is simple yet extremely effective and is particularly useful where a degassed liquid, such as deionized water, must be used to prevent gas bubble formation or collection in liquid handling devices fed by the liquid degassing system 10.

The present invention is not to be limited by the foregoing description but is to be afforded the full scope of the appended claims and all equivalents thereof.

What is claimed is:

1. A liquid degassing system comprising:
   (a) a liquid intake for receiving liquid from a supply;
   (b) a liquid discharge;
   (c) a liquid reservoir including:
      (i) inlet means for permitting liquid flow into the reservoir from the liquid intake; and
      (ii) outlet means for providing liquid flow out of the reservoir to the liquid discharge, the reservoir being located in line between the liquid intake and the liquid discharge such that substantially all liquid from the supply passes into the reservoir from the intake when travelling to the liquid discharge; and
   (d) degassification means including:
      (i) vacuum means for applying a vacuum to the reservoir for causing the formation of bubbles from gas present within liquid held by the reservoir;
      (ii) means connected to the vacuum means for removing the gas from the reservoir, having means for permitting the gas to travel from the reservoir through the inlet means;
      (iii) means for preventing liquid from entering the inlet means while removing gas from the inlet means; and
      (iv) baffle means mounted within the reservoir, the baffle means including a filter element whereby liquid from the inlet means is adapted to pass through the filter when travelling to the liquid discharge, and whereby gas flow through the filter is inhibited.

2. The system of claim 1, wherein the inlet means comprises a vacuum port located proximate an upper extremity of the reservoir, and a liquid port, the liquid port being located proximate the vacuum port.

3. The system of claim 1, wherein the inlet means comprises an inlet port of the reservoir, the outlet means comprises an outlet port of the reservoir, and the vacuum is applied through the inlet port.

4. The apparatus of claim 3, wherein the filter element has a hollow, cylindrical shape, being mounted in line between the inlet port and the outlet port, the baffle means further comprising a baffle member mounted proximate the inlet port for deflecting the liquid from the inlet port to the outside of the filter element.

5. The system of claim 1, further comprising means for inhibiting the vacuum means during flow of the liquid from the discharge.

6. The system of claim 5, wherein the means for inhibiting the vacuum means comprises a three-way solenoid valve having a common port in fluid communication with the inlet means and a vacuum port in fluid communication with the vacuum means, the valve also having an inlet port in fluid communication with the liquid supply.

7. A liquid degassing system comprising:

(a) a system inlet for receiving a liquid to be degassed;
(b) a closed reservoir having a reservoir inlet means proximate one end of the reservoir and a reservoir outlet proximate an opposite end of the reservoir;
(c) a system outlet for feeding the liquid in a degassed condition from the reservoir outlet;
(d) liquid control means for selectively producing and inhibiting a flow of the liquid from the system inlet to the system outlet, substantially all of the flow passing serially from the system inlet through the reservoir inlet means into the reservoir, and from the reservoir outlet to the system outlet;
(e) vacuum means for producing a vacuum;
(f) vacuum control means for selectively applying the vacuum to the reservoir inlet means of the reservoir when the flow of liquid is inhibited, whereby gas from the liquid in the reservoir is transported to the vacuum means; and
(g) means for preventing gas flow from the reservoir outlet.

8. The system of claim 7, wherein the liquid control means comprises a first solenoid valve connected between the system inlet and the reservoir inlet means.

9. The system of claim 8, wherein the liquid control means further comprises an outlet one-way valve connected between the reservoir outlet and the system outlet for preventing fluid flow into the reservoir during activation of the vacuum control means.

10. The system of claim 8, wherein the reservoir inlet means comprises a reservoir inlet port; the first solenoid valve comprises a first three-way valve having a common port in fluid communication with the reservoir inlet port, and an inlet port in fluid communication with the system inlet; and the vacuum control means comprises a vacuum port of the first three way valve, the vacuum port being in fluid communication with the vacuum means.

11. The system of claim 10, wherein the vacuum means further comprises:
(a) a vacuum source;
(b) a pressure source of pressurized gas;
(c) a trap chamber;
(d) means for selectively providing one of a first fluid connection wherein the trap chamber is connected to the vacuum source and to the vacuum port of the first three-way valve, and a second fluid connection wherein the trap chamber is connected to the pressure source;
(e) means for exhausting liquid from the trap chamber during the second fluid connection; and
(f) means for preventing the pressurized gas from entering the reservoir.

12. The system of claim 7, wherein the vacuum control means comprises a second solenoid valve connected between the reservoir inlet means and the vacuum means.

13. The system of claim 12, wherein the reservoir inlet means comprises a reservoir inlet port.

14. The system of claim 12, wherein the reservoir inlet means comprises a vacuum inlet proximate an upper extremity of the reservoir, and a liquid inlet proximate the one end of the reservoir.

15. The system of claim 12, wherein the second solenoid valve comprises a three-way valve having a common port, a pressure port, and a vacuum port, the vacuum port being connected to the vacuum means, the apparatus further comprising:
(a) a pressure source of pressurized gas, connected to the pressure port of the second solenoid valve;
(b) a trap chamber having a trap inlet, a trap outlet, the trap outlet being connected to the common port of the second solenoid valve, and a drain;
(c) a drain check valve connected to the drain for preventing fluid flow into the trap chamber; and
(d) the vacuum control means further comprises:
(i) means for operating the second solenoid valve for periodically connecting the pressure source to the trap chamber for exhausting liquid out of the trap chamber through the drain check valve; and
(ii) means for preventing the pressurized gas from entering the reservoir.

16. The system of claim 15, wherein the means for preventing the pressurized gas from entering the reservoir comprises a vacuum check valve connected between the trap inlet and the reservoir inlet means.

17. The system of claim 15, wherein the reservoir that means comprises a reservoir inlet port; the liquid control means comprises a first solenoid valve connected between the system inlet and the reservoir inlet port, the first solenoid valve comprising a first three-way valve having a common port in fluid communication with the reservoir inlet port, and an inlet port in fluid communication with the system inlet; and the vacuum control means comprises a vacuum port of the first three way valve, the vacuum port being in fluid communication with the vacuum means.

18. The system of claim 17, wherein the means for preventing the pressurized gas from entering the reservoir comprises a vacuum check valve connected between the trap inlet and the reservoir inlet means.

19. The system of claim 17, wherein the means for preventing the pressurized gas from entering the reservoir comprises means for synchronizing the operation of the first and second solenoid valve, whereby actuation of the second solenoid valve for connection of its common port to its pressure port occurs only when the common port of the first solenoid valve is connected to its inlet port.

20. The system of claim 7, wherein the reservoir inlet means is located proximate a top end of the reservoir, the reservoir outlet being located proximate a bottom end of the reservoir.

21. The system of claim 20, wherein the liquid control means comprises a first solenoid valve connected between the system inlet and the reservoir inlet means, the first solenoid valve comprising a first three-way valve having a common port in fluid communication with the reservoir inlet means, an inlet port in fluid communication with the system inlet, and the vacuum control means comprises a vacuum port of the first three way valve, the vacuum port being in fluid communication with the vacuum means, the vacuum being applied within a downwardly extending conduit from the common port of the first three-way valve to the reservoir inlet means, the conduit having a length of not greater than approximately 6 inches.

22. The system of claim 7, wherein the means for preventing gas flow from the reservoir outlet comprises a cylindrical filter element mounted within the reservoir, substantially all of the flow of liquid that passes from the reservoir outlet being filtered by the filter element for separating the gas therefrom.

23. The system of claim 22, wherein the filter element is formed as a cylindrical member, the reservoir outlet port being in fluid communication with an interior portion of the element, the means for preventing gas flow further comprising a baffle for directing incoming liquid from the reservoir inlet means to outside of the cylindrical member.

* * * * *

UNITED STATES PATENT AND TRADEMARK OFFICE
CERTIFICATE OF CORRECTION

PATENT NO. : 4,955,992

DATED : September 11, 1990

INVENTOR(S) : Goodale, et al.

It is certified that error appears in the above-identified patent and that said Letters Patent is hereby corrected as shown below:

Claim 17, Column 8, line 17 reads: --reservoir that means comprises-- should read --reservoir inlet means comprises--

Signed and Sealed this

Seventh Day of July, 1992

Attest:

DOUGLAS B. COMER

*Attesting Officer*       *Acting Commissioner of Patents and Trademarks*